United States Patent [19]

Hashimoto et al.

[11] Patent Number: 4,561,515
[45] Date of Patent: Dec. 31, 1985

[54] STEERING POWER TRANSMITTING EQUIPMENT

[75] Inventors: Akio Hashimoto, Kawasaki; Tomio Yasuda, Kasukabe, both of Japan

[73] Assignee: Aisin Seiki Kabushiki Kaisha, Kariya, Japan

[21] Appl. No.: 628,301

[22] Filed: Jul. 6, 1984

[30] Foreign Application Priority Data

Sep. 1, 1983 [JP] Japan ................. 58-161018

[51] Int. Cl.$^4$ ............................................. B62D 5/04
[52] U.S. Cl. .................... 180/79.1; 74/388 PS
[58] Field of Search ................... 180/79.1; 74/388 PS

[56] References Cited

U.S. PATENT DOCUMENTS

| 4,223,254 | 9/1980 | Adams | 318/2 |
| 4,250,765 | 2/1981 | Niklaus et al. | 74/388 PS |
| 4,416,345 | 11/1983 | Barthelemy | 180/79.1 |
| 4,448,275 | 5/1984 | Kitagawa et al. | 180/79.1 |

FOREIGN PATENT DOCUMENTS

| 0051015 | 5/1982 | European Pat. Off. |
| 0081025 | 6/1983 | European Pat. Off. |
| 0051515 | 6/1984 | European Pat. Off. |
| 58-141963 | 8/1983 | Japan | 180/79.1 |
| 2006701 | 5/1979 | United Kingdom |
| 2103161 | 2/1983 | United Kingdom |
| 2108916 | 5/1983 | United Kingdom |
| 2132950 | 7/1984 | United Kingdom |

Primary Examiner—Larry Jones
Assistant Examiner—Allen J. Flanigan
Attorney, Agent, or Firm—Banner, Birch, McKie & Beckett

[57] ABSTRACT

The steering power transmitting equipment of the present invention comprises a steering gear mechanism having a steering wheel, an upper steering shaft, lower steering shaft and steering gear box, the steering gear mechanism having a torque sensor fixed on the upper steering shaft, a bracket disconnectably fixed to the steering gear box, an electric motor supported on the bracket, a driven gear which is driven by the electric motor and fixed coaxially to the lower steering shaft and an electric controller. The electric controller controls the rotating speed and rotating direction of the electric motor corresponding to the torque and the torque direction inputted by the torque sensor. The power steering gear mechanism is easily mounted on or demounted from standard manual steering equipment without requiring any large scale remodelling of the steering equipment.

2 Claims, 9 Drawing Figures

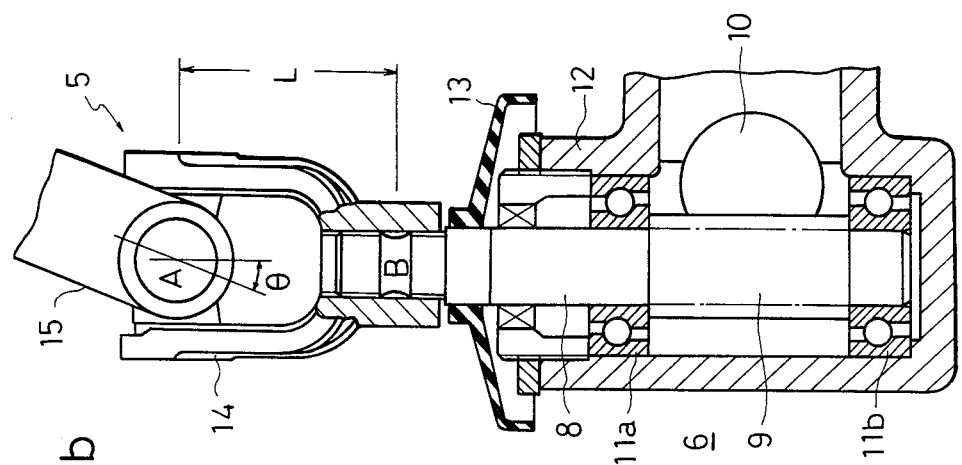
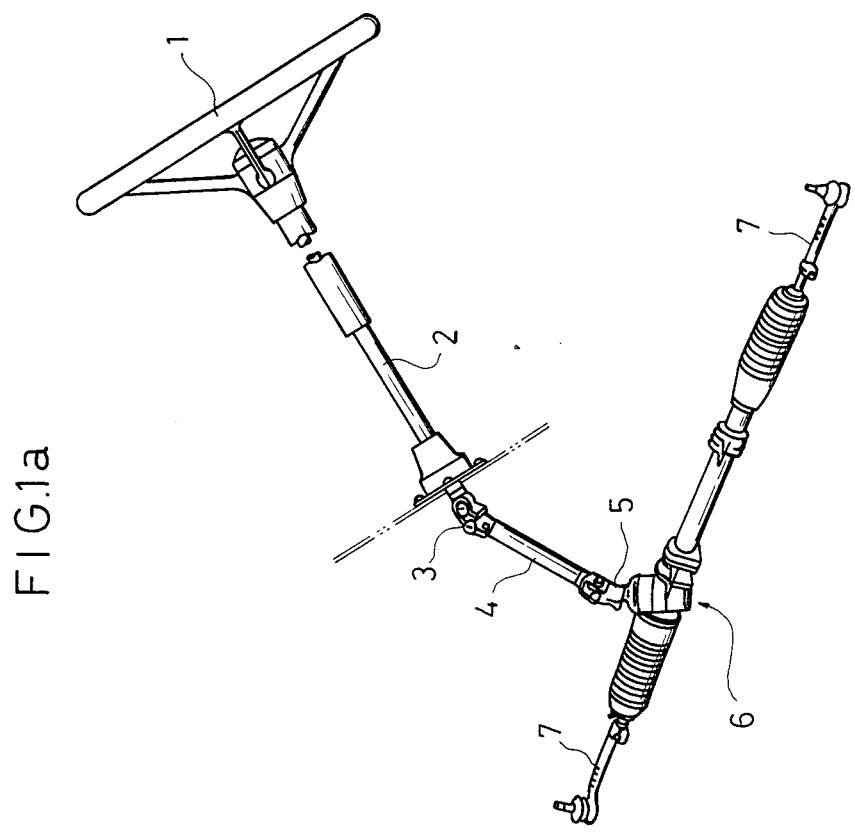
FIG.1a
FIG.1b

STEERING POWER TRANSMITTING EQUIPMENT

BACKGROUND OF THE INVENTION

1. Field of the Invention

This invention relates to equipment for transmitting vehicle steering power applied to a steering wheel to the automotive tires, and particularly to such equipment for vehicles equipped with electric-powered steering.

2. Description of the Prior Art

Generally a relatively large force is required to rotate the steering wheel of a vehicle for changing the tire direction when a vehicle stands still or moves at a low speed. Still larger steering power is required for a front wheel drive vehicle, the number of which vehicle has recently substantially increased, since the front part of such vehicle is burdened with a large weight.

Power steering equipment has been known for assisting the steering force of a driver. This equipment is designed to generate a driving force in proportion with the driver's steering force and transmit the generated force to the vehicle steering system. Most of the power steering equipment now in practical use is of the hydraulically powered type. Such hydraulic equipment, comprising control valves and a hydraulic cylinder, generates an auxiliary power force by transferring a quantity of hydraulic oil in accordance with the steering force applied by the driver.

However, the control valves and the hydraulic cylinder are large in size and the pipes and their attachments for interconnecting the valves and the cylinder should be bent to have curvatures larger than certain minimum values to prevent large pressure losses. In addition, such hydraulic equipment requires secure sealing to prevent oil leakage and requires expensive labor in its installation on a vehicle. Therefore, an electric motor has been proposed as a power source for driving power steering equipment.

Installing electric-powered steering equipment on a vehicle involves much different cost and non-restricting conditions according to the method with our invention used to connect the output shaft of the electric motor and the steering mechanism for the reasons to be explained below.

FIG. 1a on the attached drawings shows a general manual steering mechanisms for a vehicle without power steering. In the mechanism, a steering wheel 1 is connected to an upper steering shaft 2, which is further connected to a middle steering shaft 4 via a universal joint 3. The middle steering shaft 4 is then connected through a universal joint 5 to a manual steering gear mechanism 6, which is further connected to tie rods 7 for controlling the direction in which the tires (not shown) are turned.

The manual steering gear mechanism 6 shown in FIG. 1b is of the rack and pinion type. FIG. 1b shows the construction of the steering gear mechanism along with the adjacent components. As shown in FIG. 1b, the output shaft 14 of the universal joint 5 is connected to one end of a lower steering shaft 8, the other end of which is formed with a pinion 9. A rack 10 connected to the tie rods 7 is engaged with the pinion 9. The lower steering shaft 8 is rotatably supported within a manual steering gear housing 12 via bearings 11a and 11b. A dust cover 13 is also generally provided.

With this design, the steering shaft is divided into three parts, namely, upper shaft 2, middle shaft 4 and lower shaft 8, which are connected by two universal joints 3 and 5, thereby resulting in the fact that the axial direction of the pinion 9 cannot be aligned with the axis of the steering wheel 1. In this type of connection, in which the input shaft is obliquely connected with the output shaft, a sinusoidal variation of torque is produced in the output shaft even if a constant torque is applied to the input shaft.

In handling a steering mechanism with such type of connection, the driver may feel heavy or light driving forces at one time or another. Therefore, in such case as in the structure of FIG. 1a, the inclination between the upper and lower steering shafts 2 and 4 is usually designed to be identical with the angle ($\theta$) between the middle and lower steering shafts 4 and 8, in order to assure that torque variations at the two points are mutually cancelled.

In power steering equipment in which the rotational speed of the output shaft of an electric motor is reduced, it is preferred to minimize the reduction ratio for simplification of the construction. For this purpose, it is recommended that the output shaft of the power steering should be connected to the input side of the manual steering gear mechanism. In this connection, the output shaft of the power steering equipment may be connected to any one of the upper, middle or lower steering shafts 2, 4 and 8. These three cases will be examined below.

Firstly, attention may be given to the case of connection to the upper steering shaft 2. Since there is a toe or floor board isolating the passenger compartment from the engine compartment in the vicinity of universal joint 3, connection of the upper shaft 2 with the output shaft of the power steering equipment may interfere with vehicle operation by the driver.

Secondly, considering connecting to the middle steering shaft 4, since this shaft 4 is connected to the shaft 8 with an inclination angle $\theta$ (FIG. 1b), the connection of shaft 4 with the output shaft of the power steering equipment causes the transfer of a variable torque to the steering shaft 8, even if a constant auxiliary torque is generated at the output shaft.

Additionally, since a large portion of the shaft 4 is situated in the engine compartment beyond or outside of the toe or floor board, it is very difficult to add a mechanism to this portion or replace the portion after the vehicle has been completely assembled.

Thirdly, the last case involves connection to the lower steering shaft 8. As shown in FIG. 1a and FIG. 1b, the shaft 8 has such a very limited length that it is difficult to connect the shaft 8 directly to the output shaft of power steering equipment.

Therefore, the possibility arises to provide a longer equivalent of the lower shaft 8 to be connected to the output shaft of the power steering equipment. If this design change is to be done, the inclination between steering shafts 4 and 8 will be changed. In accordance with such a change, the inclination between the upper and middle steering shafts 2 and 4 should be changed. Thus, large scale remodelling will be required of the steering mechanism.

SUMMARY OF THE INVENTION

Accordingly, the primary object of the present invention is to make it possible to mount or demount power steering equipment and to make possible the optional provision of such equipment, without necessitating any large scale remodelling of the conventional steering mechanism.

Namely, the present invention provides a means to connect the output shaft of an electric motor to the lower steering shaft 8 without altering the length of the steering shafts 2, 4 and 8 in order to mount or demount power steering equipment without any particular remodelling of the usual steering mechanism.

BRIEF DESCRIPTION OF THE DRAWINGS

FIGS. 1a and 1b are respectively a perspective view and a partially enlarged sectional view, showing a well known automotive steering mechanism without any power steering equipment;

DETAILED DESCRIPTION OF THE INVENTION

The steering power transmitting equipment of the present invention employs a steering gear mechanism similar to that used for manual steering transmission.

This steering gear includes a steering wheel, an upper steering shaft, a lower steering shaft and a steering gear box, this steering gear box having a gear housing and a steer shaft.

Between an upper and lower steering shafts there may be employed a steering gear mechanism including a middle steering shaft.

The steering shafts are usually connected with each other by such as an universal joint. The input shaft parts and/or output shaft parts of the joint may serve as the aforesaid middle steering shaft.

The steering gear box may be either rack and pinion type or recirculating ball type.

The steering power transmitting equipment of the present invention further includes a torque sensor, an electric controller, and an electric motor for applying rotating torque to the aforesaid lower steering shaft.

The torque sensor, electric controller, and electric motor may be similar to those used for conventional power steering transmitting equipment. For example, a strain gauge may be used as a torque sensor, which detects the rotating torque applied to the upper steering shaft by the driver and the direction thereof, thereby inputting such information to the electric controller. The electric controller controls the rotating speed and rotating direction of the electric motor, in correspondence with the torque and the torque direction inputted by the torque sensor. Such electric motors as a servomotor and a pulse motor can be employed.

The aforesaid transmitting mechanism comprises a driven gear integrally fixed to the aforesaid lower steering shaft, a bracket fixed to the gear housing of the steering gear box, and an electric motor fixed to the bracket.

The motor shaft of the electric motor is mechanically connected to the driven gear. If the electric motor does not include reduction gears, a reduction gear box which is rotatably held in the reduction gear housing may be disposed between the motor shaft and the driven gear. The reduction gear housing is attached to the bracket and the electric motor is fixed to the reduction gear housing. The lower steering shaft may be the output shaft part of the joint connection between a steer shaft and upper steering shaft or middle steering shaft. The output shaft part is separatably connected with the steer shaft. The end portion of the steer shaft may be a lower steering shaft.

DESCRIPTION OF PREFERRED EMBODIMENTS

The preferred embodiments of the present invention will now be described in detail with reference to the accompanying drawings.

Figure 2:
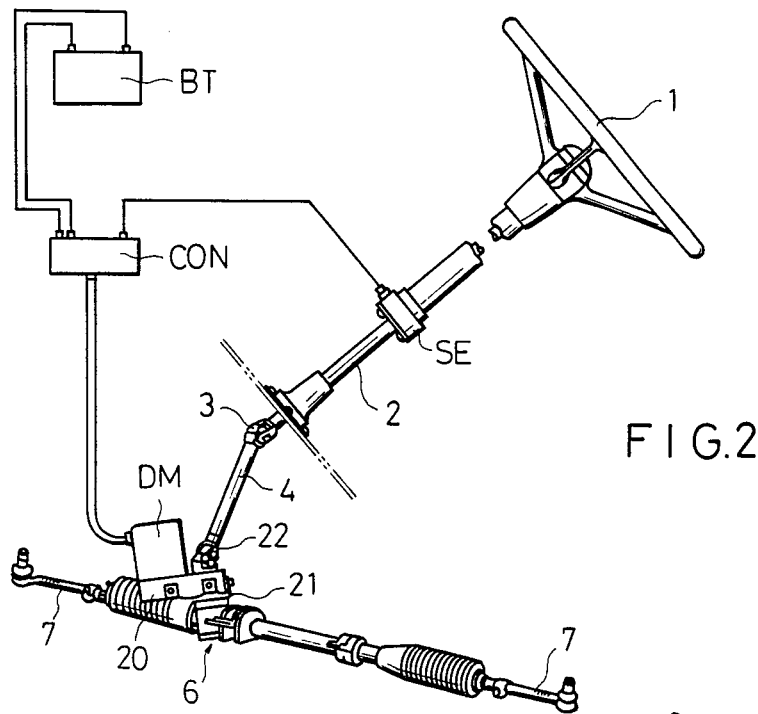
FIG. 2 is a perspective view including a block diagram showing a manual automotive steering mechanism equipped with electric-motive power steering in accordance with the invention.

FIG. 2 shows an automative steering mechanism equipped with electric-motive power steering equipment involving steering force transmitting equipment in accordance with the embodiment. As shown in FIG. 2, a steering wheel 1 is connected to the first steering shaft 2, which is further connected to the second steering shaft 4 via the first universal joint 3, which is still further connected to the second universal joint 22. The output shaft of the universal joint 22 is connected to a manual steering gear mechanism 6.

The output shaft of the manual steering gear mechanism 6 is connected to tie rods 7 for controlling the steering direction of the vehicle. A power steering gear mechanism 20 is connected to the input side of the manual steering gear mechanism 6, and a DC servo motor DM is connected to the input side of the power steering gear mechanism 20.

The power steering gear mechanism 20 is bolted to a bracket 21 which is fixed to the housing of the manual steering gear mechanism 6.

The DC servo motor DM is controlled by an electronic control device CON. In this embodiment, a torque sensor SE for detecting an input torque applied to the steering mechanism by a driver, is installed on the first steering shaft 2. And, BT is an on-board battery serving as a power source for the power steering equipment. There is a toe or floor board isolating the engine compartment from the passenger compartment in the vicinity of the first universal joint 3, located at the end of the first steering shaft 2.

Figure 3:
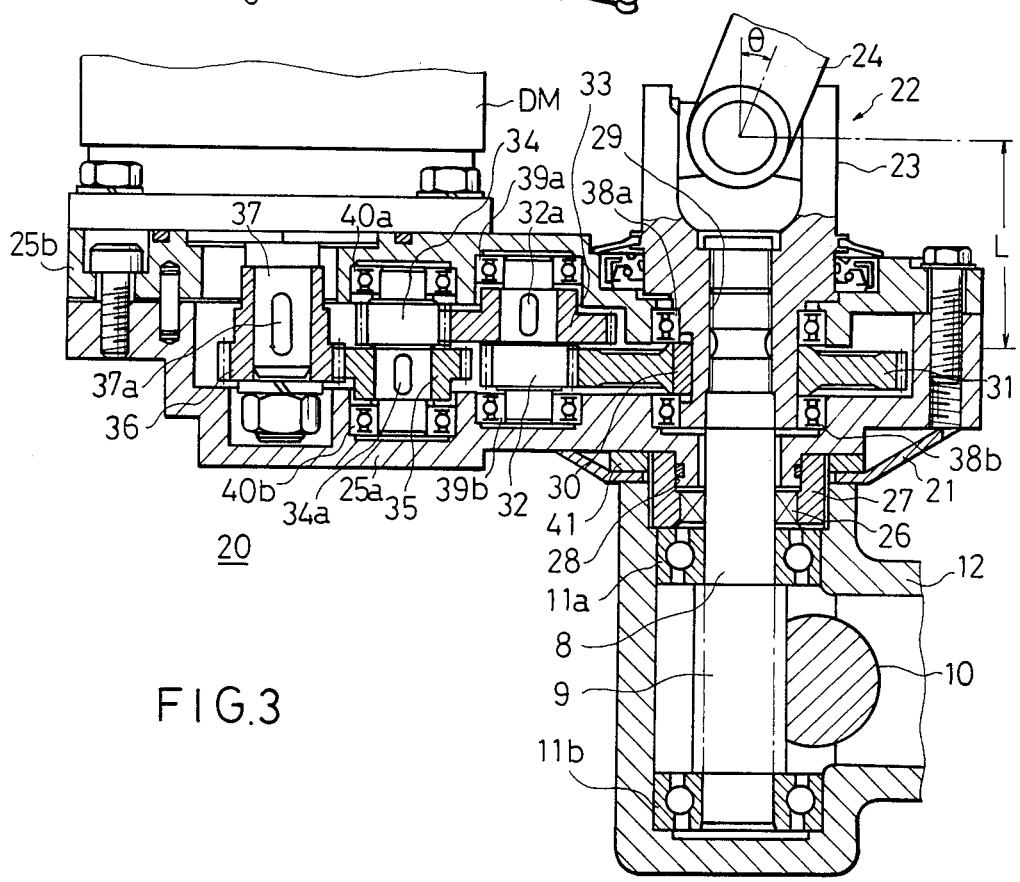
FIG. 3 is a partially enlarged sectional view showing the construction surrounding the manual steering gear mechanism shown in FIG. 2.
Figure 5A:
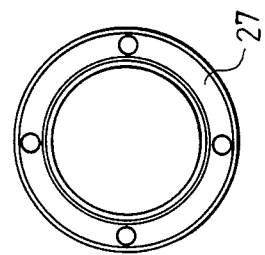
FIGS. 5a and 5b are respectively a plan view and a front view of the member 27 shown in FIG. 3.
Figure 5B:
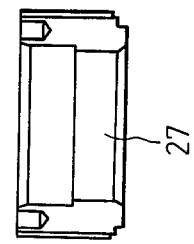
Figure 4A:
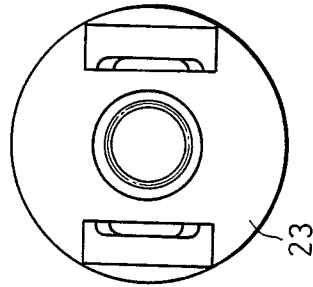
FIGS. 4a and 4b are respectively a plan view and a front view of the member 23 shown in FIG. 3.
Figure 4B:
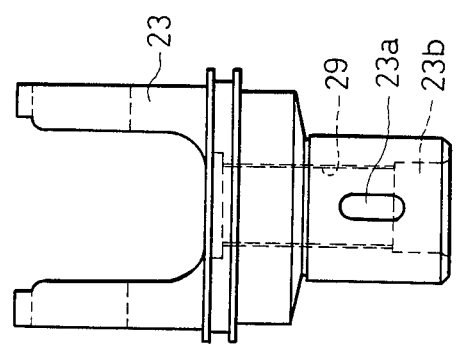

FIG. 3 shows the construction surrounding the manual steering gear mechanism 6, shown in FIG. 2. FIGS. 4a and 4b show the configurations of the member 23 in FIG. 3 and FIGS. 5a and 5b show the member 27 in FIG. 3. Further explanation will be made by reference to FIGS. 3, 4a, 4b, 5a and 5b.

The universal joint 22 is a hook type joint comprising members 23, 24 with fork-shaped connections for each other and a cross-shaped arm and pin for connecting the members 23, 24. The joint 22 can transmit force even if the inclination angle between the members 23 and 24 may be varied. In this embodiment, the inclination angle, $\theta$, between the members 23 and 24 is set to be equal to the inclination angle between the first steering shaft 2 and the second steering shaft 4.

The manual steering gear mechanism 6 comprises a pinion 9 and a rack 10. The pinion 9 is fixed to the end of the third steering shaft 8. The shaft 8 is rotatably supported on the manual steering gear housing 12 via two ring bearings 11a and 11b at the front and rear sides of the pinion 9.

Since splines 29 are formed on both the outer peripherical surface of the third steering shaft 8 and the inner surface of the member 23 mating with the third shaft 8, the third steering shaft 8 and the member 23 are relatively movable in the axial direction but are not relatively slidable in the peripheral direction.

The member 23 is rotatably supported on the power steering gear housing 25a, 25b via ring bearings 38a and 38b. The first gear 31 of the power steering gear mechanism 20 is fitted to the periphery of the smaller diameter part of the member 23. A key way 23a is formed on the periphery of the member 23. Insertion of a key 30 in the key way 23a assures driving fixation of the first gear 31 onto the member 23.

A second gear 32 engages with the first gear 31. A fourth gear 34 engages with the third gear 33 fixed to the rotational shaft of the second gear 32. The sixth gear 36 engages with a fifth gear 35 fixed to the rotational shaft of the fourth gear 34.

The sixth gear 36 is fitted with the drive shaft 37 of a DC servo motor DM. And, 32a, 34a, and 37a are key ways. The second gear 32 and the third gear 33 are rotatably supported on the power steering gear housing 25a, 25b via ring bearings 39a, 39b, respectively. And, the fourth gear 34 and the fifth gear 35 are rotatably support on the power steering gear housing 25a, 26b via the ring bearings 40a, 40b, respectively.

A guide ring 27, shown in FIGS. 3, 5a and 5b, is installed in the interior of one end of the manual steering gear housing 12. The guide ring 27 is fastened to the manual steering gear housing 12 via threads formed on the periphery of the guide ring 27. A bracket 21 is installed on the projecting part of guide ring 27 to fixedly secure the power steering gear housing 25a, 25b thereto. A lock nut 41 is screwed onto the guide ring 27 to fix the bracket 21 to the manual steering gear housing 12.

When the lower protruding part of the power steering gear housing 25a, 25b is pushed down along the interior periphery of the guide ring 27 until it engages with the ring bottom, this protruding part is precisely positioned concentric with the axis of the third steering shaft 8.

A faucet washer joint connects the extension pheriphery surface of the lower protruding part of the power steering gear housing 25a, 25b with the interior periphery of the guide ring 27. And, numeral 26 indicates an oil seal.

In a vehicle which does not employ power steering equipment, the construction may be adopted in which only the member 23 is fitted onto the third steering shaft 8. In such construction the power steering gear housing 25a, 25b and the mechanism involved therein is simply eliminated. However, even in such case, it is better to keep the guide ring 27 and the bracket 21 installed. Then in the case where power steering equipment is to be installed in a vehicle without power steering equipment, the second universal joint 22 is removed from the third steering shaft 8, and the member 23 of the second universal joint 22 is mated with the power steering gear housing 25a, 25b including the necessary gear mechanisms therein. Then, the assembled part is inserted along the interior periphery of the guide ring 27 and the power steering gear housing 25a, 25b is bolted to the bracket 21. Thus, the power steering equipment is easily completely installed.

In accordance with this invention, it is not necessary to replace the steering shaft 8 or provide a special member between the shaft 8 and the universal joint 22, when power steering equipment is to be mounted or demounted. Therefore, no change is made in the length (e.g. L, FIG. 3) between any position on the steering shaft 8 and the connecting position of two members 23, 24 of the universal joint 22. This results in no change in the inclination between the two members 23, 24. Thus, it is not required to change the design, the lengths and the mounting positions of other parts of the steering mechanism.

Figure 6:
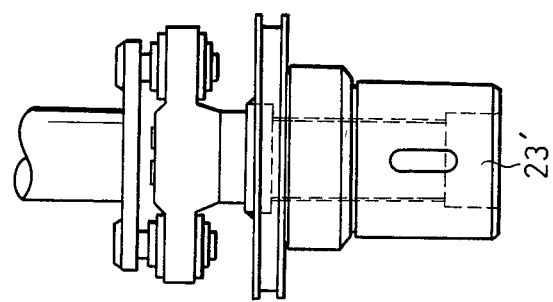
FIG. 6 is a front view of a member which may be substituted for member 23.

Although the universal joint 22 in the above-mentioned embodiment is a hook type joint, it may take the form of a flexible joint 23' as shown in FIG. 6, a spherical knuckle joint, or other construction, as long as it is a joint directly engaged with the steering shaft 8. Also, in the embodiment, the steering shaft 8 is designed to be inserted in the interior cavity of the universal joint member 23 but a reverse construction would also be possible, in which the joint is inserted in a cavity provided in the steering shaft.

In view of the foregoing, the present invention is advantageous in that the power transmitting mechanism for power steering equipment can be easily mounted or demounted without involving large reconstruction of the mechanism. Also, optical provision of power steering equipment is made possible and the maintenance of the equipment can be easily made.

What is claimed is:

1. Steering power transmitting equipment comprising:
    a steering gear mechanism including at least a steering wheel, an upper steering shaft, a lower steering shaft, a steering gear box having a gear housing and a steer shaft for transmitting steering power from said steering wheel to said steer shaft and a middle steering shaft between said upper and lower steerng shafts;
    a torque sensor connected to said upper shaft for detecting the torque applied through said steering wheel to said upper shaft;
    a driven gear coaxially connected to one of said lower steering shaft and said steer shaft, said lower shaft being an output shaft part of a joint connected to said middle steering shaft and said driven gear being coaxially fixed to said output shaft part, and said steer shaft being disconnectably coupled to said output shaft part;
    a bracket fixed to said gear housing;
    an electric motor coupled to drive said driven gear, said motor being held by said bracket, said electric motor including reduction gears and a reduction gear housing rotatably mounting said reduction gears, said reduction gear housing being supported by said bracket;
    an electric controller which controls said electric motor according to the input signal sent from said torque sensor;
    said gear housing having an internally threaded axial bore in which said steer shaft is rotably inserted, and a guide ring with external threads connected to said internal threads of said axial bore, a central through hole in said guide ring in which said steer shaft is inserted and an inner guide surface formed coaxially at one end of said central through hole, said reduction gear housing having a guide part with a through hole in which said steer shaft is inserted, said guide part being inserted into said inner guide surface of said guide ring.

2. Steering power transmitting equipment according to claim 1, wherein said bracket has a connecting part which is pressed between the edge surface surrounding said axial bore and said reduction gear housing.

* * * * *